United States Patent
Pasoi et al.

(10) Patent No.: US 10,241,650 B1
(45) Date of Patent: Mar. 26, 2019

(54) SELECTION AND PRESENTATION OF UNVIEWED MESSAGES

(71) Applicant: Twitter, Inc., San Francisco, CA (US)

(72) Inventors: Mircea-Bogdan Pasoi, San Francisco, CA (US); Cristian-George Strat, San Francisco, CA (US); Mihai Claudiu Toader, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 15/339,784

(22) Filed: Oct. 31, 2016

Related U.S. Application Data

(63) Continuation of application No. 14/181,543, filed on Feb. 14, 2014, now Pat. No. 9,483,529.

(51) Int. Cl.
```
G06F 17/30      (2006.01)
G06F 3/0482     (2013.01)
G06F 3/0485     (2013.01)
```

(52) U.S. Cl.
CPC .......... *G06F 3/0482* (2013.01); *G06F 3/0485* (2013.01); *G06F 17/3053* (2013.01)

(58) Field of Classification Search
None
See application file for complete search history.

(56) References Cited

U.S. PATENT DOCUMENTS

| | | | |
|---|---|---|---|
| 7,593,995 B1 * | 9/2009 | He | G06Q 10/107 707/999.003 |
| 2003/0090524 A1 * | 5/2003 | Segerberg | H04N 5/44543 715/786 |
| 2007/0203991 A1 * | 8/2007 | Fisher | G06Q 10/107 709/206 |
| 2011/0119258 A1 * | 5/2011 | Forutanpour | G06Q 10/107 707/723 |
| 2013/0162515 A1 * | 6/2013 | Prociw | G06F 1/1616 345/156 |
| 2014/0280616 A1 * | 9/2014 | Ramanathan | H04L 51/22 709/206 |
| 2014/0324999 A1 * | 10/2014 | Dan | H04L 51/22 709/206 |

* cited by examiner

*Primary Examiner* — Anhtai V Tran
(74) *Attorney, Agent, or Firm* — Fish & Richardson P.C.

(57) ABSTRACT

A method for message selection, including: receiving a request for unviewed messages, the request identifying a context account, ranking the set of unviewed messages according to ranking criteria, where the ranking criteria is used to rank each of the set of unviewed messages based on an engagement history between the context account and an authoring account of the unviewed messages; generating, based on ranking the set of unviewed messages, a result set identifying a subset of the set of unviewed messages, and providing the result set in response to the request.

30 Claims, 9 Drawing Sheets

SELECTION AND PRESENTATION OF UNVIEWED MESSAGES

CROSS REFERENCE TO RELATED APPLICATIONS

This application is a continuation of and claims priority to U.S. patent application Ser. No. 14/181,543, filed on Feb. 14, 2014, the entire contents of which are hereby incorporated by reference.

BACKGROUND

The development and proliferation of sophisticated mobile computing devices such as smart phones and tablets have likely contributed to a sudden rise in the usage of social networking messaging platforms and applications. With increasingly powerful computing devices and extensive mobile networks, social networking has become available at any time and almost everywhere. Popular messaging platforms often provide functionality for users to draft and send messages (both synchronously and asynchronously) to other users. Other common features include the ability to "post" messages that are visible to one or more identified other users of the platform, or even publicly to any user of the platform without specific designation by the authoring user.

SUMMARY

In general, in one aspect, the invention relates to a method for message selection. The method can include: receiving a request for unviewed messages, the request identifying a context account; ranking the set of unviewed messages according to ranking criteria, where the ranking criteria is used to rank each of the set of unviewed messages based on an engagement history between the context account and an authoring account of the unviewed messages; generating, based on ranking the set of unviewed messages, a result set identifying a subset of the set of unviewed messages; and providing the result set in response to the request.

In general, in one aspect, the invention relates to a system for message selection. The system can include: a computer processor, a selection repository including a set of unviewed messages associated with a message stream of a context account, a selection engine executing on the computer processor and configured to receive a request for unviewed messages, the request identifying the context account; rank the set of unviewed messages according to ranking criteria, where the ranking criteria is used to rank each of the set of unviewed messages based on an engagement history between the context account and an authoring account of the unviewed messages; generate, based on ranking the set of unviewed messages, a result set identifying a subset of the set of unviewed messages; and provide the result set in response to the request.

In general, in one aspect, the invention relates to a non-transitory computer-readable storage medium having instructions for message selection in a messaging platform. The instructions are configured to execute on at least one computer processor to enable the computer processor to: receive a request for unviewed messages, the request identifying a context account; rank the set of unviewed messages according to a set of ranking criteria, where the ranking criteria is used to rank each of the set of unviewed messages based on an engagement history between the context account and an authoring account of the unviewed messages; generate, based on ranking the set of unviewed messages, a result set identifying a subset of the set of unviewed messages; and provide the result set to in response to the request.

In general, in one aspect, the invention relates to a method for displaying a set of unviewed messages. The method can include: receiving, based on engagement history between an authoring account and a context account, a subset of a set of unviewed messages according to ranking criteria; displaying the subset of the set of unviewed messages in reverse chronological order concurrently with a user interface element indicating an existence of additional messages in the set of unviewed messages; receiving a selection of the user interface element; and providing for display, in response to the selection, at least one additional message from the set of unviewed messages.

In general, in one aspect, the invention relates to a system for displaying a plurality of unviewed messages. The system can include: a computer processor; a user interface generation module executing on the computer processor and configured to receive, based on engagement history between an authoring account and a context account, a subset of a set of unviewed messages according to ranking criteria; display the subset of the set of unviewed messages in reverse chronological order concurrently with a user interface element indicating an existence of additional messages in the set of unviewed messages; receive a selection of the user interface element; and provide for display, in response to the selection, at least one additional message from the set of unviewed messages.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1A:
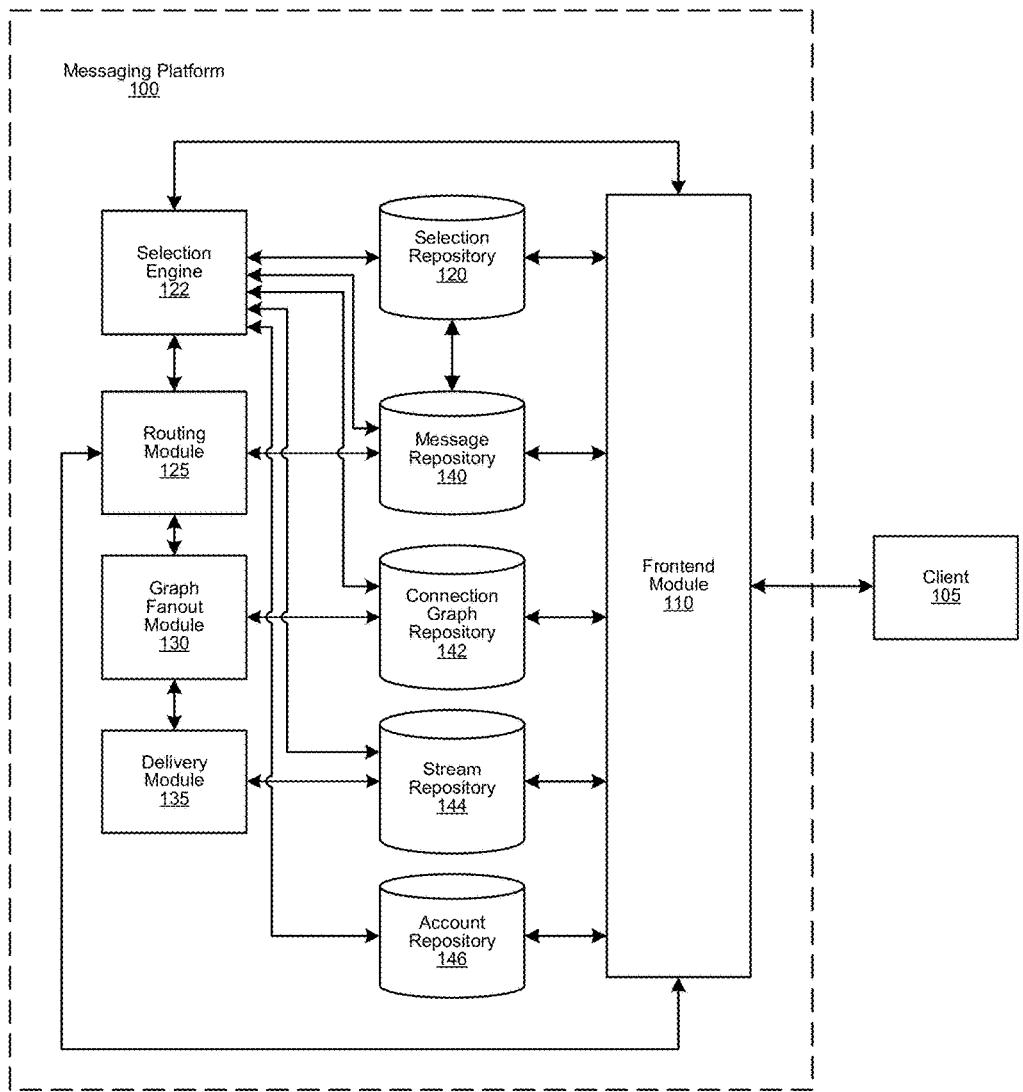
FIG. 1A shows a schematic diagram of a system, in accordance with one or more embodiments of the invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

In general, embodiments of the invention provide a method and system for providing messages unviewed by a user in a messaging platform. The user may send a request to receive unviewed messages. When the request is received from the user, the requested unviewed messages are ranked according to ranking criteria. Ranking criteria may be based on the engagement history between the user and other users in the messaging platform. Subsequently, a result set identifying a subset of the unviewed messages based on the ranking of the unviewed messages is generated. In response to the request, the result set may be provided to the user.

FIG. 1A shows a messaging platform (100) and a client (105) in accordance with one or more embodiments of the invention. As shown in FIG. 1A, the messaging platform (100) has multiple components including a frontend module (110), a selection engine (122), a routing module (125), a graph fanout module (130), a delivery module (135), a selection repository (120), a message repository (140), a connection graph repository (142), a stream repository (144), and an account repository (146). Various components of the messaging platform (100) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment of the invention.

In one or more embodiments, the messaging platform (100) is a platform for facilitating real-time communication between one or more entities. For example, the messaging platform (100) may store millions of accounts of individuals, businesses, and/or other entities (e.g., pseudonym accounts, novelty accounts, etc.). One or more users of each account may use the messaging platform (100) to send messages to other accounts inside and/or outside of the messaging platform (100). The messaging platform (100) may be configured to enable users to communicate in "real-time", i.e., to converse with other users with a minimal delay and to conduct a conversation with one or more other users during concurrent sessions. In other words, the messaging platform (100) may allow a user to broadcast messages and may display the messages to one or more other users within a reasonable time frame so as to facilitate a live conversation between the users. Recipients of a message may have a predefined graph relationship with an account of the user broadcasting the message. In one or more embodiments, the user is not an account holder or is not logged in to an account of the messaging platform (100). In this case, the messaging platform (100) may be configured to allow the user to broadcast messages and/or to utilize other functionality of the messaging platform (100) by associating the user with a temporary account or identifier.

In one or more embodiments, the messaging platform (100) connects users to other users (i.e., clients) of the messaging platform (100), exchanges social networking messages between connected users of the messaging platform (100), and provides an interface for a user to create and view social network messages. In one or more embodiments, social network messages are broadcast social networking messages that are transmitted to at least a set of users. The users in the set may be self-selected (e.g., followers of the transmitting user) or users that satisfy a certain status with the transmitting user (e.g., belong to a group, friend, family, etc.). The social networking messages may include, for example, a comment from a user on a document, personal status update, a reference to a document, and any other information.

Figure 1B:
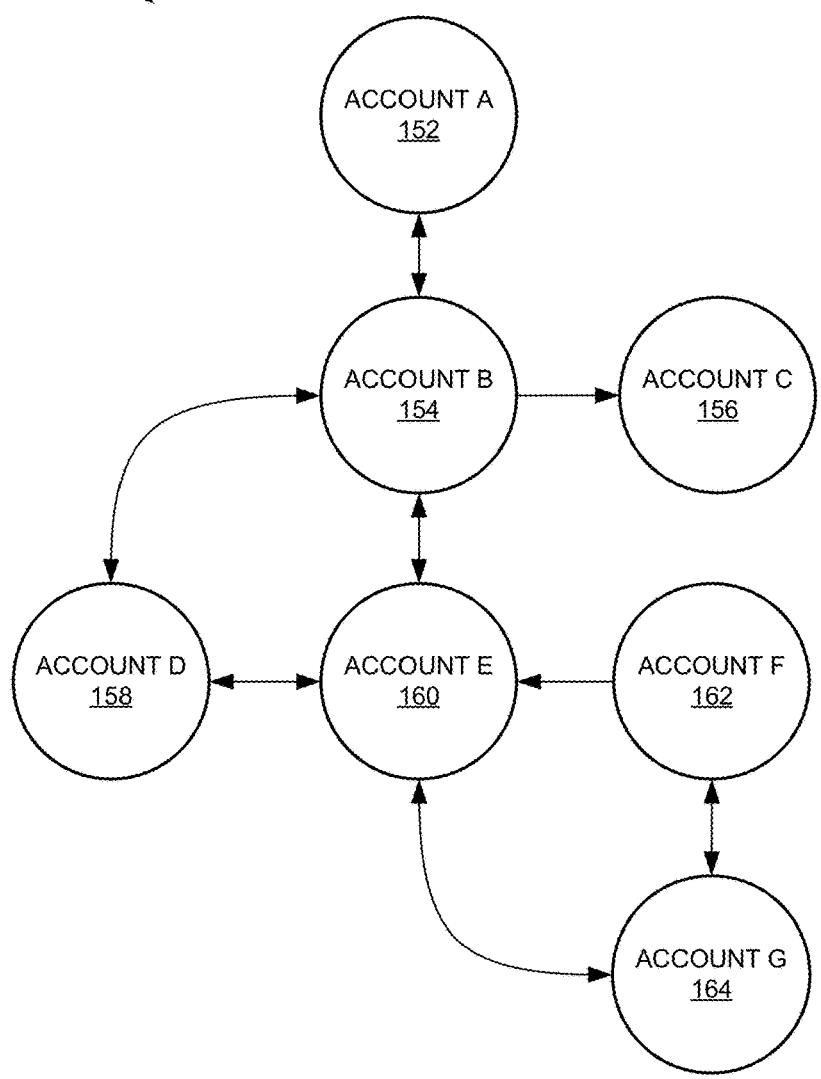
FIG. 1B shows an example depiction of a connection graph in accordance with one or more embodiments of the invention.

FIG. 1B shows an example depiction of a connection graph (150) in accordance with one or more embodiments of the invention. In one or more embodiments, the connection graph repository (142) is configured to store one or more connection graphs. As shown in FIG. 1B, the connection graph (150) includes multiple components including nodes representing accounts of the messaging platform (100) (i.e., Account A (152), Account B (154), Account C (156), Account D (158), Account E (160), Account F (162), Account G (164)) and edges connecting the various nodes.

The connection graph (150) is a data structure representing relationships (i.e., connections) between one or more accounts. The connection graph (150) represents accounts as nodes and relationships as edges connecting one or more nodes. A relationship may refer to any association between the accounts (e.g., following, friending, subscribing, tracking, liking, tagging, and/or etc.). The edges of the connection graph (150) may be directed and/or undirected based on the type of relationship (e.g., bidirectional, unidirectional), in accordance with various embodiments of the invention.

The messaging platform (100) includes functionality to broadcast streams of messages to one or more accounts based at least partially on a connection graph representing relationships between those accounts (see FIG. 1B). A stream may be a dynamic list of messages associated with one or more accounts or can reflect any arbitrary organization of messages that is advantageous for the user of an account. For purposes of this disclosure, a "message" can include a user authored message and/or any content (multimedia, text, etc.) broadcasted/posted by an account of a messaging platform.

Returning to FIG. 1A, in one or more embodiments, the routing module (125) includes functionality to receive one or more social networking messages and to store the social networking messages in the message repository (140). The routing module (125) may include functionality to assign an identifier to the social networking message and to provide identification of a sender of the social networking message to the graph fanout module (130).

In one or more embodiments, the graph fanout module (130) includes functionality to retrieve graph data from the connection graph repository (142) and to use the graph data to determine which user accounts in the messaging platform (100) should receive the social networking message. The graph data, for example, may reflect which user accounts in the messaging platform are "following" a particular account and are, therefore, subscribed to receive social networking messages from the particular user account.

In one or more embodiments, the delivery module (135) includes functionality to receive a list of user accounts from the graph fanout module (130) and the message identifier generated by the routing module (125) and to insert the message identifier into stream data associated with each identified account. The delivery module (135) may then store the message list in the stream repository (144). The stream data stored in the stream repository (144) may constitute one or more streams associated with one or more user accounts of the social network application (100). A stream may be a dynamic list of social networking messages associated with one or more user accounts or may reflect any organization of social networking messages that is advantageous for the user of an account.

In one or more embodiments, the frontend module (110) is a software application or a set of related software applications configured to communicate with external entities (e.g., client (120)). The frontend module (110) may include the application programming interface (API) and/or any number of other components used for communicating with entities outside of the messaging platform (100). The API may include any number of specifications for making requests from and/or providing data to the messaging platform (100). For example, a function provided by the API may provide artist/song recommendations to a requesting client (105).

In one or more embodiments, the frontend module (125) is configured to use one or more of the data repositories (message repository (140), connection graph repository (142), stream repository (144), discovery repository (148), and/or account repository (145)) to define streams for serving social networking messages (i.e., stream data) to a user of the account on the messaging platform (100). A user may use any client (120) to receive the social networking messages. For example, where the user uses a web-based client to access the messaging platform (100), an API of the frontend module (125) may be utilized to define one or more streams and/or to serve the stream data to the client for presentation to the user. Similarly, different forms of message delivery may be handled by different modules in the frontend module (125). In one or more embodiments, the user may specify particular receipt preferences, which are implemented by the frontend module (125).

In one or more embodiments, one or more of the data repositories (message repository (140), connection graph repository (142), stream repository (144), account repository (146), and/or selection repository (120)) is a database and/or storage service residing on one or more servers. For example, one or more of the data repositories may be implemented as a storage service using service-oriented architecture (SOA) and configured to receive requests for data and to provide requested data to other components of the social network application (100). In another example, the message repository (140) may include one or more tables in a distributed database management system (DBMS), a clustered database, a standalone flat file, and/or any storage software residing on one or more physical storage devices. Examples of a storage device may include, but are not limited to, a hard disk drive, a solid state drive, and/or other memory device. Any type of database or storage application may be used, in accordance with various embodiments of the invention.

In one or more embodiments, one or more of the data repositories (message repository (140), connection graph repository (142), stream repository (144), account repository (146), and/or selection repository (120)) is a separate application or set of applications residing on one or more servers external (and communicatively coupled) to the messaging platform (100). Alternatively, in one or more embodiments, one or more of the data repositories may be an integrated component of the messaging platform (100) and/or may reside, either partially or entirely, on one or more common hardware devices (e.g., a server).

In one or more embodiments, the selection repository (120) may store messages (e.g., social networking messages) and message metadata (e.g., social networking message metadata) associated with a message stream for a context account. The messages may include additional associated content such as audio, video, and images. Further, the message metadata may include tracking information to determine whether a message is viewed or unviewed by the context account. In one or more embodiments, the message metadata may include tracking information to identify the status of a message as viewed or unviewed. In addition, the tracking information may include recorded engagement history between users.

In one or more embodiments, the message repository (140) includes functionality to store messages and message metadata. The message metadata may include an identifier of the broadcasting/posting user account of the social networking message, a list of users that received the social networking message, a number of users that received the social networking message, statistics (e.g., a ratio of following user accounts to the broadcasting/posting user account that forward the social networking message to non-following user accounts to the broadcasting/posting user account that forward the social networking message), time and date in which the social networking message is transmitted, and other information.

In one or more embodiments, the connection graph repository (142) may store information about users. Specifically, the connection graph repository may relate user identifiers of a user to user's preferences and history in the social network application (100). For example, the user preferences and history may include language preferences, following user accounts of a user account, topics that a user account is interested in, and any other information.

Figure 2:
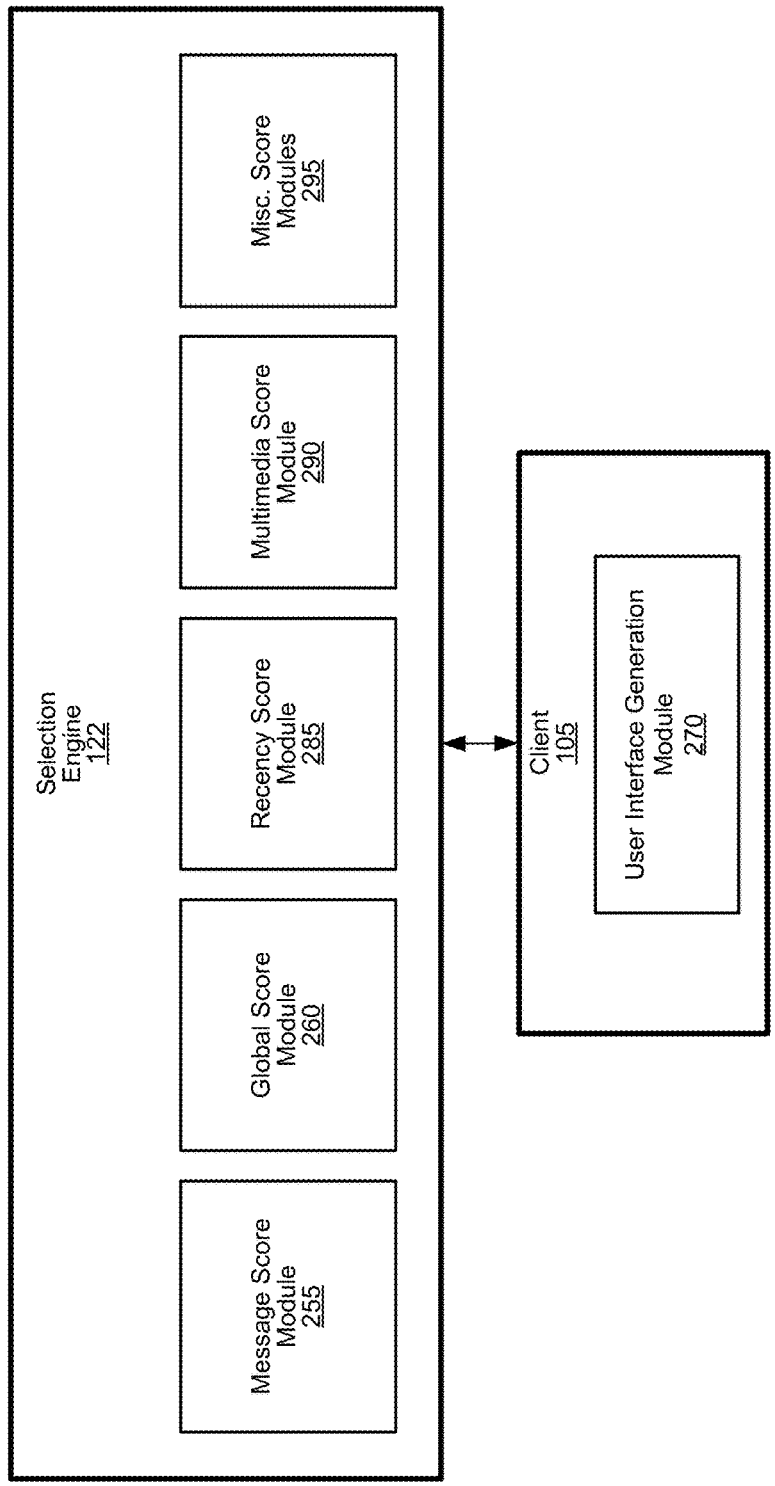
FIG. 2 shows a schematic diagram of a system, in accordance with one or more embodiments of the invention.

FIG. 2 shows a schematic diagram of a system in accordance with one or more embodiments of the invention. In one or more embodiments, the selection engine (122) includes one or more of the components shown by FIG. 2. The components included by the selection engine (122) may be communicatively coupled with one another.

In one or more embodiments, the selection engine (122) includes functionality to receive a request for unviewed messages, the request identifying a context account. For example, the selection engine (122) may receive the request from the client (105) by a user associated with the context account. In one or more embodiments, the selection engine (122) includes functionality to receive multiple requests from one or more clients. The context account can be any account associated with and/or relevant to a request for content. In one example, the context account is an account of a user for which content is requested. In another example, the context account is an account or authoring account of a message from which a link was selected resulting in the request. The request may include an identifier that identifies the context account.

In one or more embodiments, the selection engine (122) includes functionality to rank the set of unviewed messages according to ranking criteria. The unviewed messages may be broadcasted or engaged with by user accounts that may or may not be closely connected to the context account in the connection graph (150). The messages may be ranked based on a degree of relationship between the context account and user accounts, engagement history between the context account and user accounts, and/or any other criteria that can be used to rank the messages. The ranking criteria may include criteria that can be used to determine a rank for a message or a set of messages. The connection graph (150) can be used to identify the degree of relationship between the context account and user accounts. For example, referring to FIG. 1B, assuming that Account A (152) is the context account, messages by Account B (154) may be ranked higher than messages by Account C (156) based on those accounts' degree of relationship with Account A (152) (e.g., Account B has a first degree relationship while Account C has a second degree relationship). In other words, the degree of relationship can be determined according to how closely connected the user accounts are to the context account.

In one or more embodiments, the selection engine (122) includes functionality to rank the messages and assign a ranking score (e.g., an integer or a rational number in a range, a percentage, etc.) to represent rank according to the ranking criteria. For example, the selection engine (122) can rank the messages by assigning a ranking score to each message based on the degree of relationship of its authoring account with the context account, where the ranking score range is 0 to 10 and a message with a ranking score of 10 is most likely to be subsequently selected. For example, referring to FIG. 1B, assuming that Account A (152) is the context account, messages by Account B (154) may be assigned a ranking score of '10', messages by Account E (160) may be assigned a ranking score of '9', messages by Account G (164) may be assigned a ranking score of '8', and so on, based on those accounts' degree of relationship with Account A (152).

In one or more embodiments, the selection engine (122) includes functionality to use the ranking criteria to rank each of the set of unviewed messages based on an engagement history between the context account and an authoring account of the unviewed messages. An authoring account can be an account that originally posts a message in the message platform 100. Examples of an engagement history between user accounts can include, but are not limited to, a number of rebroadcasts of the authoring account's messages by the context account, a number of favorites/likes of the authoring account's messages by the context account, a number of responses to the authoring account's messages by the context account, a number of mentions or references of the authoring account's messages by the context account, a number of followers/connections/friends of the authoring account within the context account's connection graph, an indication that the authoring account is a favorite account by the context account, prior engagement with a conversation between the authoring account and the context account, and/or an amount of any other activity associated with one or more unviewed messages.

In one or more embodiments, the selection engine (122) can identify an amount of engagement between the context account and the authoring account, and rank each of the set of unviewed messages with a ranking score corresponding to the amount of engagement. For example, referring to FIG. 1B, assuming that Account A (152) is the context account, engagement by Account B (154) including 12 responses to, 9 rebroadcasts of, and 20 favorite indications to Account A's (152) messages may amount to a ranking score of 41 for Account B (154) (e.g., if each unit of engagement equals '1' ranking score point).

In one or more embodiments, the selection engine (122) includes functionality to use the ranking criteria to rank each of the set of unviewed messages based on an engagement history of user accounts of the messaging platform 100 with the authoring account of the unviewed messages and/or the unviewed messages. For example, the selection engine (122) may identify the engagement history between user accounts and the authoring account. The engagement history may include a high amount of activity between the user accounts and the authoring account. The selection engine (122) can rank the unviewed messages received by the user accounts from the authoring account based on the engagement history. In another example, the selection engine (122) may identify the engagement history between user accounts and a set of messages. An unviewed message may be added to the set of messages. The selection engine (122) can rank the unviewed message based on the engagement history between the user accounts and the set of messages. Examples of an engagement history can include, but are not limited to, a number of rebroadcasts of a message by other accounts of the messaging platform, a number of favorites/likes of a message by other accounts of the messaging platform, a number of responses to a message by other accounts of the messaging platform, a number of mentions or references of an authoring account of an unviewed message by other accounts of the messaging platform, and/or an amount of any other activity associated with one or more unviewed messages.

In one or more embodiments, the selection engine (122) includes functionality to identify, for each of the set of unviewed messages, an engagement frequency and/or recency between the authoring account of the unviewed messages and the context account. For example, the selection engine (122) may include functionality to use information representing a frequency and/or recency that messages of an authoring account were viewed, rebroadcasted, favorite, or responded to by the context account. In one or more embodiments, the selection engine (122) includes functionality to rank the unviewed messages according to the engagement frequency and/or recency. For example, the selection engine (122) can rank unviewed messages that have been rebroadcasted or shared more often with a higher score than unviewed messages that have been rebroadcasted less often.

In one or more embodiments, the selection engine (122) includes functionality to weight a ranking score associated with each unviewed message based on at least one weighting criterion. For example, the selection engine (122) may place more weight on an indication by the context account that an authoring account is a favorite account than a recency of a broadcasting of a message. In one or more embodiments, the selection engine (122) includes functionality to weight the ranking scores of one or more messages based on an engagement history associated with the message(s). Thus, for example, the ranking scores of messages having more engagement history can be weighted more heavily than those having less engagement history.

In one or more embodiments, the selection engine (122) includes functionality to identify a number of shares of each of the set of unviewed messages by the context account. Shares include sharing messages from the context account with other accounts. Further, the number of shares include the amount that a particular unviewed message or the set of unviewed messages is shared by the context account. For example, the selection engine (122) may use the number of times an unviewed message is shared to weight the ranking score of the unviewed message.

In one or more embodiments, the selection engine (122) includes functionality to identify a set of related messages between two or more accounts. The set of related messages may include messages containing duplicate message content (e.g., keywords, phrases, media, etc.) and/or related content (e.g., content related to the same story, content related to the same topic, etc.). The selection engine (122) can include functionality to rank the set as a whole in addition to or in place of ranking individual messages. For example, 100 unviewed messages identified to contain similar content may be ranked as a single entity. Subsequently, the selection engine (122) can include functionality to select one set of related messages to provide over another based on the ranking of each set. Further, the selection engine (122) can include functionality to select individual messages from a set based on the individual messages' individual ranking score and/or the ranking score of the set.

In one or more embodiments, the selection engine (122) includes functionality to generate, based on ranking the set of unviewed messages, a result set identifying a subset of the set of unviewed messages. The subset of the set of unviewed messages can include unviewed messages that are ranked highly by the selection engine (122) according to the ranking criteria. In addition, the result set may include ranked unviewed messages as sets of unviewed messages.

In one or more embodiments, the selection engine (122) includes functionality to identify an amount of related messages of the subset of the set of unviewed messages from a first account associated with the context account. For example, the selection engine (122) can identify one or more messages in a context account's message stream that are related by being partially or entirely duplicates of one another. For example, duplicate messages could be the same (e.g., additional instances of a message posted through rebroadcasting or sharing) or similar to one another (e.g., partially quoted messages).

In one or more embodiments, the selection engine (122) includes functionality to identify an amount of the related messages between the first account and a second account. For example, a user account receives duplicate messages in the user account's message stream as a result of following user accounts that broadcast or rebroadcast a message about a particular news event. The selection engine (122) can identify a relation of the broadcasted or rebroadcasted instances of the message. Further, the selection engine (122) can determine that the rebroadcasted messages are therefore related messages.

In one or more embodiments, the selection engine can rank the related messages, based on the amount of the related messages between the first account and the second account. For example, the selection engine (122) can rank the duplicative rebroadcasted messages of user accounts with a low score, such that those duplicative rebroadcasted messages will be less likely to be chosen for presentation to the context account, thereby avoiding presentation of duplicative messages.

In one or more embodiments, the selection engine (122) includes functionality to identify a second subset of the set of unviewed messages authored by the first account. The selection engine (122) can identify additional subsets of the set of unviewed messages according ranking criteria. For example, two separate subsets of the set of unviewed messages can be identified according to different ranking criterion of the ranking criteria. In one or more embodiments, the selection engine (122) can rank the set of unviewed messages, where the second subset of the set of unviewed messages are weighted according to the ranking criteria based on being authored by the first account.

In one or more embodiments, the selection engine (122) includes functionality to identify a second subset of the set of unviewed messages authored by a preferred account associated with the context account. The preferred account can be an account distinguished as preferred by a user account. In one or more embodiments, the selection engine (122) includes functionality to identify a set of preferred accounts using one or more criteria. For example, the selection engine (122) can identify a set of preferred accounts based on an indication of preferred accounts by the context account, a predefined graph relationship between user accounts and the context account, a frequency and/or recency of engagement between user accounts and the context account, a frequency and/or recency of visits of profile pages of user accounts by the context account, geographical locations of user accounts and the context account, a geographical proximity between user accounts and the context account, and/or popularity scores of the user accounts within the context account's connection graph or within the messaging platform. In addition, the selection engine (122) can rank preferred messages received from the preferred account according to the ranking criteria.

In one or more embodiments, the selection engine (122) includes functionality to rank the set of unviewed messages, where the second subset of the set of unviewed messages is positively weighted according to the ranking criteria based on being authored by the preferred account. A positive weighting may weight an unviewed message such that its likelihood of selection is increased over other unviewed messages that otherwise have the same rank. For example, assume that a first unviewed message has been assigned a ranking score of '1' (e.g., '1' point for being authored by a user account associated with a celebrity) and that a second unviewed message also has been assigned a ranking score of '1' (i.e., '1' point for being authored by the preferred account). The selection engine (122) may place more weight on the second unviewed message, based on being authored by the preferred account, than the first unviewed message that is not authored by the preferred account. As a result, the second unviewed message has an effective ranking score greater that '1' and therefore more likely to be selected. For example, if the selection engine (122) places double the weight on messages authored by the preferred account, then the second unviewed message has an effective ranking score of '2'.

In one or more embodiments, the selection engine (122) includes functionality to identify a set of affiliated accounts. For example, the selection engine (122) can identify an affiliation of accounts based on the similarity of one or more messages broadcasted by the affiliated accounts. For example, messages by affiliated accounts may be partially or entirely duplicates of one another. Duplicate messages can be the same (e.g., additional instances of a message posted through rebroadcasting or sharing of that message) or similar to one another (e.g., partially quoted messages). For example, a user account receives duplicate messages in the user account's message stream as a result of following user accounts associated with 10 executives of the same company. One of the executive's user accounts may post a message and the 9 other executives' user accounts may rebroadcast that message. The selection engine (122) can identify the 9 rebroadcasted instances of the message. Further, the selection engine (122) can determine that the 10 executives' user accounts are therefore affiliated. In another example, the selection engine (122) can identify an affiliation of user accounts based on an indication of an affiliation by the affiliated user accounts (e.g., an indication in a user account profile that the user account is affiliated with an organization) or by other user accounts of the messaging platform 100. In another example, the selection engine (122) can identify an affiliation of user accounts based on user account names (e.g., same or similar character strings in the user account name).

In one or more embodiments, the selection engine (122) includes functionality to identify, among the set of unviewed messages, a set of affiliated messages authored by the set of affiliated accounts. For example, a context account receives duplicate messages in the context account's message stream as a result of following affiliated user accounts associated with 10 executives of the same company. One of the executive's user accounts may post a message and the 9 other executives' user accounts may rebroadcast that message. The selection engine (122) can identify the 9 rebroadcasted instances of the message. Further, if an affiliation of the 10 executives' user accounts was not previously identified, the selection engine (122) can determine that the 10 executives' user accounts are therefore affiliated based on the message rebroadcasts. In another example, a user maintains a personal account and a business account. Any duplicate message presented on both accounts signifies an overlap of content. A frequent occurrence of the overlap of content increases the level of affiliation between the personal account and the business account of the user.

In one or more embodiments, the selection engine (122) includes functionality to rank the set of affiliated messages based on a level of affiliation. The selection engine (122) can rank the set of affiliated messages corresponding to the level of affiliation between the affiliated accounts. For example, the selection engine (122) identifies a highly-affiliated set of messages broadcasted by accounts that have a high level of affiliation with one another and identifies a lowly-affiliated set of messages broadcasted by accounts that have a low level of affiliation with one another. The selection engine (122) can rank the highly-affiliated set of messages with a lower score and the lowly-affiliated set of messages with a higher score. As a result, the probability that the highly-affiliated set of messages will be eventually selected for presentation to the context account is lower than the probability that the lowly-affiliated set of messages will be eventually selected for presentation to the context account. For example, the selection engine (122) can rank the highly-affiliated set of messages with a ranking score of '−10' and the lowly-affiliated set of messages with a ranking score of '0' out of a range of −10 to 0. As a result, a score of '0' will not negatively affect the ranking score of a lowly-affiliated message while a score of '−10' will negatively affect the ranking score of a highly-affiliated message. It should be appreciated that different ranking score ranges are possible (e.g., a range of −5 to 5 for a highly-affiliated and lowly-affiliated message, respectively, where the ranking score of 5 increases the overall ranking score of a message rather than a ranking score of '0' that simply doesn't affect an overall score of a message).

In one or more embodiments, ranking scores for different criteria (e.g., affiliation, degree of relationship, amount of engagement) can be combined to reach an overall ranking score. Each ranking score may be weighted differently (e.g., a degree of relationship score of '9' may be given more weight than an amount of engagement score of '9') or adjusted (e.g., a degree of relationship score range of 0 to 10 may be shifted to a range of −5 to 5 to better align with an affiliation score range of −5 to 5).

In one or more embodiments, the selection engine (122) includes functionality to provide the result set in response to the request. For example, the selection engine sends the result set to the client (105) for display to a user associated with the context account.

In one or more embodiments, the selection engine includes a message score module (255), a global score module (260), a recency score module (285), a multimedia score module (290), and a miscellaneous score module (295).

In one or more embodiments, the message score module (255) includes functionality to rank a set unviewed messages of a user account according to ranking criteria. The ranking criteria may include criteria to determine a rank for each unviewed message. For example, the ranking criteria may use the frequency and/or recency of engagement with a message. In one or more embodiments, the message score calculator (255) includes functionality to calculate a message score for each unviewed message of a user account. The message score may include a sum of identifiers of users selecting the unviewed message as a favorite message, the number of times that a particular message is repeated for presentation to users, the number of times the unviewed message is selected, the number of times the unviewed message is responded to (e.g., replied), the number of times the unviewed message is viewed by other users, and any other criteria. In one or more embodiments, the message score module (255) may rank an unviewed cluster. Each cluster may be a collection of messages. Messages in a cluster may be linked based on related degree of relation between the messages with one another. Further, the message score may positively or negatively affect the rank for the unviewed message or cluster according to the ranking criteria.

In one or more embodiments, the message score module (255) include functionality to combine ranking criteria with a global score calculator (260). The combining of ranking criteria may be performed immediately upon or concurrently with calculation of the message score, after certain ranking criteria is satisfied, periodically, or at another time.

In one or more embodiments, the global score module (260) includes functionality to globally rank an unviewed message. Specifically, the unviewed messages can be globally ranked across all user accounts of the messaging platform, across user accounts corresponding to users from a geographic location (e.g., all users located in a particular country), according to a degree of relationship between two or more accounts (e.g., all user accounts within four degrees of separation), and/or using any other criteria to globally rank a message. For example, the global score module (260) includes functionality to calculate a global score (e.g., global weight, global rank, etc.) for an unviewed message. In one or more embodiments, the global score module (260) can rank the set of unviewed messages according to a global signal. The global score may include the number of times a message occurs based on a global log, for example, a sum of identifiers of users including a hyperlink or reference in a message, and/or any other information to rank messages using global signals across the messaging platform 100. In one or more embodiments, the global signal includes an unviewed message share amount, an amount of preferred accounts and preferred messages associated with the context account, an amount of unviewed URL messages comprising a uniform resource locator (URL), and an engagement value associated with the URL. In addition, the global score may combine with other ranking criteria or scores to rank the message. For example, the global score module (260) may represent the global score and the message score of the message as a combined numeric score.

In one or more embodiments, the recency score calculator (285) includes functionality to calculate a recency score for an unviewed message. In one or more embodiments, calculating the recency score may include identifying the time duration a message exists and determining a score based on how recently a message was posted. For example, if a message includes an article providing details about nutrition remains unviewed by the user for several days, the recency score of the message exponentially decreases each day the message remains unviewed by the user. In other words, the recency score is penalized continuously throughout the duration that a message is unviewed. Alternatively, the more recent a message is viewed after the creation of the message increases the recency score. In one or more embodiments, the recency score calculator (285) includes functionality to combine the recency score with other scores (e.g., message score, global score, etc.) to rank an unviewed message.

In one or more embodiments, a multimedia score (290) includes functionality to calculate a multimedia score for an unviewed message. The multimedia score may include determining that a message includes a media type. For example, an unviewed message that includes audio, and image, and/or a video receives a higher multimedia score.

In one or more embodiments, the multimedia score module (290) may rank an unviewed messages according to its content. Specifically, in one or more embodiments, the multimedia score module (290) may include functionality to rank an unviewed message in comparison to other messages of a message stream. Ranking the unviewed message may include identifying a frequency, recency, and/or an amount of media types (e.g., messages including videos, pictures, audios, articles, etc.) associated with the unviewed message. In other words, the multimedia score module (290) may identify ranking criteria for ranking unviewed messages according to included media type. For example, when web links appear more frequently in a message stream, then messages including web links are ranked with a lower score than other media types.

The modules (255, 260, 285, 290) may be coupled with additional miscellaneous score modules (295) in accordance with one or more embodiments of the invention. In other words, the miscellaneous score modules (295) may include one or more additional score modules. Further, the miscellaneous score modules (295) may include functionality to further calculate an unviewed message score. Specifically, the miscellaneous score module (295) may include functionality to calculate any number of scores to combine with an existing score (e.g., message score, etc.) according to one or more ranking criteria.

Continuing with FIG. 2, in one or more embodiments, the selection engine (122) is communicatively coupled with the client (105). The client (105) includes a user interface generation module (270). In one or more embodiments, the user interface generation module (270) includes functionality to receive, based on engagement history between an authoring account and a context account, a subset of a set of unviewed messages according to ranking criteria. The subset of the set of unviewed messages can include messages unviewed by the context account identified by the selection engine (122).

In one or more embodiments, the user interface generation module (270) includes functionality to display the subset of the set of unviewed messages in reverse chronological order concurrently with a user interface element indicating an existence of additional messages in the set of unviewed messages. The user interface elements can include various graphical elements (e.g., layout elements and interactive elements) to represent the set of unviewed messages. In one or more embodiments, the user interface generation module (270) includes functionality to sort the subset of the set of unviewed messages. For example, the subset of the set of unviewed message can be sorted chronologically, according to ranking criteria, preferences set by a user, or any other criteria to sort the set of unviewed messages.

In one or more embodiments, the user interface generation module (270) includes functionality to receive a selection of the user interface element. The selection of the user interface element may include an interaction by a user with a user interface element (e.g., by interaction with a touchscreen of a mobile device). In one or more embodiments, the user interface generation module (270) includes functionality to provide for display, in response to the selection, at least one additional message from the set of unviewed messages. The user interface generation module (270) can generate additional user interface elements to represent the set of unviewed messages according to the selection of the user interface element. For example, a user interface element can represent an unviewed message of the set of unviewed messages from a message cluster. The user interface generation module (270) can generate additional user interface elements representing additional messages from the message cluster of the set of unviewed messages. In addition, the user interface generation module (270) can generate additional user interface elements representing unviewed messages that include similar content to the currently displayed message or message cluster (e.g., multimedia types, duplicate messages, etc.).

While FIGS. 1A, 1B, and 2 show configurations of components, other configurations may be used without departing from the scope of the invention. For example, various components may be combined to create a single component. As another example, the functionality performed by a single component may be performed by two or more components. For example, the messaging platform 100 may be a distributed application. A portion of the distributed application may be located on one or more users' computing devices while another portion may be located on different servers. Further, by way of another example, the selection engine may be a separate application from the messaging platform 100.

Figure 3:
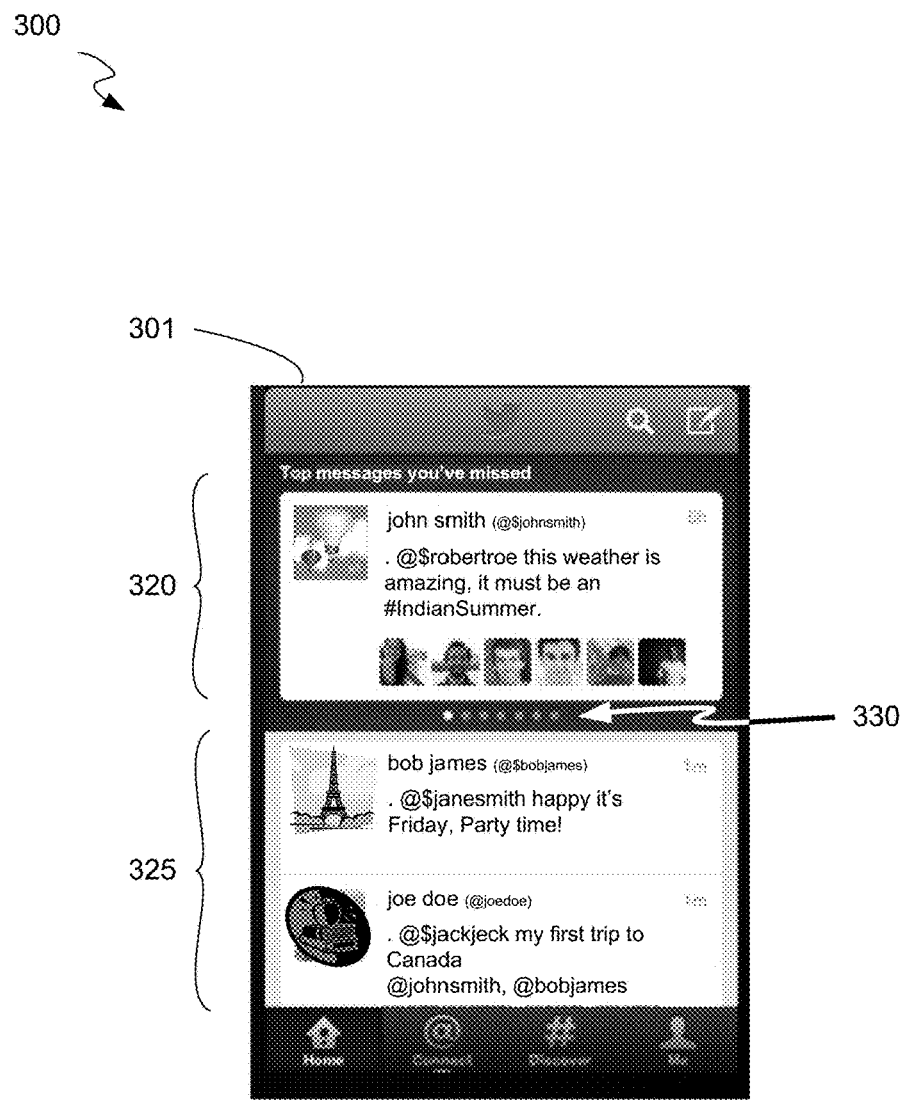
FIGS. 3, and 4A show views of exemplary user interfaces, according to one or more embodiments of the present invention.

FIG. 3 shows an example user interface 300 in accordance with one or more embodiments of the invention. As shown in FIG. 3, a mobile phone 301 displays the user interface 300 with a top unviewed messages section 320 and a message stream section 325. The user interface 300 may be displayed on a touchscreen of a mobile device or any other device capable of display. In this example, the sections 320 and 325 may include user interface elements. The user interface elements, as shown in FIG. 3, include social networking data (e.g., messages, profile pictures, etc.). Additionally, the sections 320 and 325 may be arranged in any other orientation without limiting the scope of the invention.

The top unviewed messages section 320 may display the highest ranked messages unviewed by the context account while the message stream section 325 may display messages from the context account's message stream. The top unviewed messages section 320 may provide a user interface control to scroll through unviewed messages. In one or more embodiments, the user interface generation module (270) may sort the unviewed messages in the top unviewed messages section (320) in an order that is different from the sorting order of messages in the message stream section (325). The user interface generation module (270) may receive instructions regarding message sort order from the messaging platform (100) (e.g., instructions originating from the selection engine (122)). For example, the messages in the message stream section (325) may be sorted in reverse chronological order according to authoring or broadcasting time. Meanwhile, the unviewed messages in the top unviewed messages section (320) may be sorted according to a ranking score associated with each message.

In one or more embodiments, the user interface generation module (270) includes functionality to provide the subset of the set of unviewed messages for display in a first section, where the first section is configured to provide the subset of the set of unviewed messages in a horizontal arrangement operable to be scrolled horizontally. For example, the top unviewed messages section 320 may scroll horizontally through unviewed messages in a horizontal sliding and/or in a carousel scrolling fashion. Carousel scrolling includes rotating user interface elements in a circular motion such that one user interface element at a given point in the horizontal scroll is enlarged for clarity while the surrounding elements diminish and/or grow (optionally gradually) in size. A scrolling progress element 330 may represent the progress of a scroll operation. For example, each dot in a group of dots may correspond to an unviewed message element, and a highlighted dot may indicate the position of the currently displayed unviewed message with respect to the other unviewed messages for display.

In one or more embodiments, the user interface generation module (270) includes functionality to display a second section adjacent to the first section, where the second section is configured to vertically arrange and vertically scroll objects. For example, the top unviewed messages section 320 represents the first section and the message stream section 325 represents the second section, respectively. In this configuration, the message stream section 320 may scroll vertically in accordance with one or more embodiments of the invention.

In one or more embodiments, the user interface generation module (270) includes functionality to display a first section adjacent to a second section, where the first section is operable to scroll the set of unviewed messages in a first scrolling direction orthogonal to a second scrolling direction of objects in the second section. For example, the top unviewed messages section 320 represents the second section and the message stream section 325 represents the first section. While both the top unviewed messages section 320 and the message stream section 325 may be operable to scroll, one my scroll while the other stays stationary. In another example, the top messages section 320 and the message stream section 325 can scroll simultaneously in response to one or more operations (e.g., two gestures on a touchscreen of a mobile device) triggering both scrolling directions.

The message stream section 325 may provide control to scroll through messages from the context account's message stream. The message stream section 325 may present messages from the message stream in reverse chronological order.

It should be appreciated that the top unviewed messages section 320 may display on profile pages, timelines, mobile devices, or any devices capable of displaying unviewed messages of the messaging platform 100. Further, the top unviewed messages section 320 and/or the message stream section 325 may display as separate sections such that both sections are isolated from one another. For example, the top unviewed messages section 320 may include a user interface element that presents the message stream section 320 separately from the top unviewed messages section 325. In addition, the scroll direction of the sections (320 and 325) can be configured to include multiple directions such that both sections may scroll in any direction.

Figure 4A:
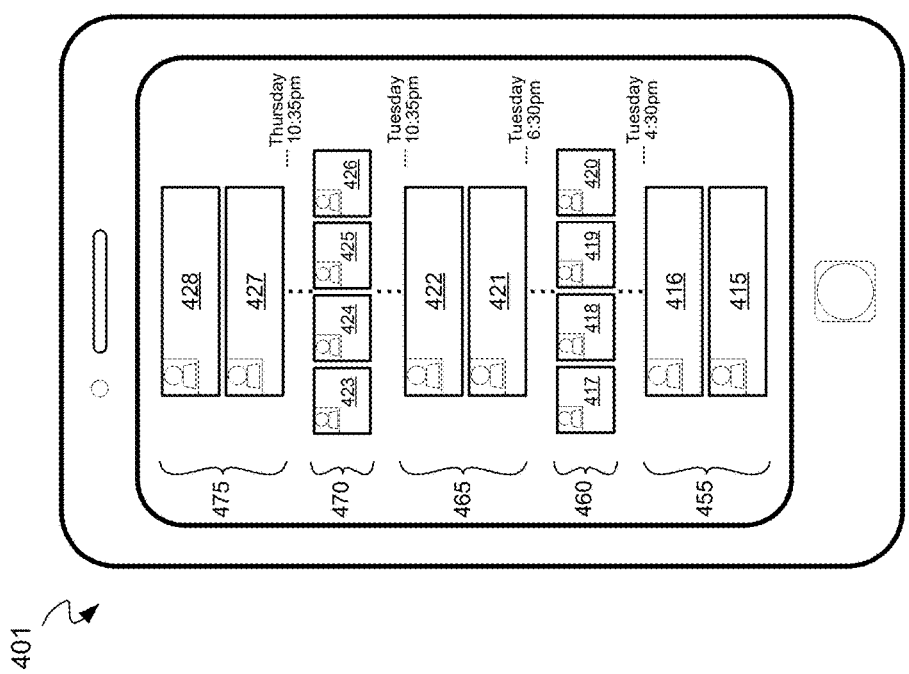
Figure 4B:
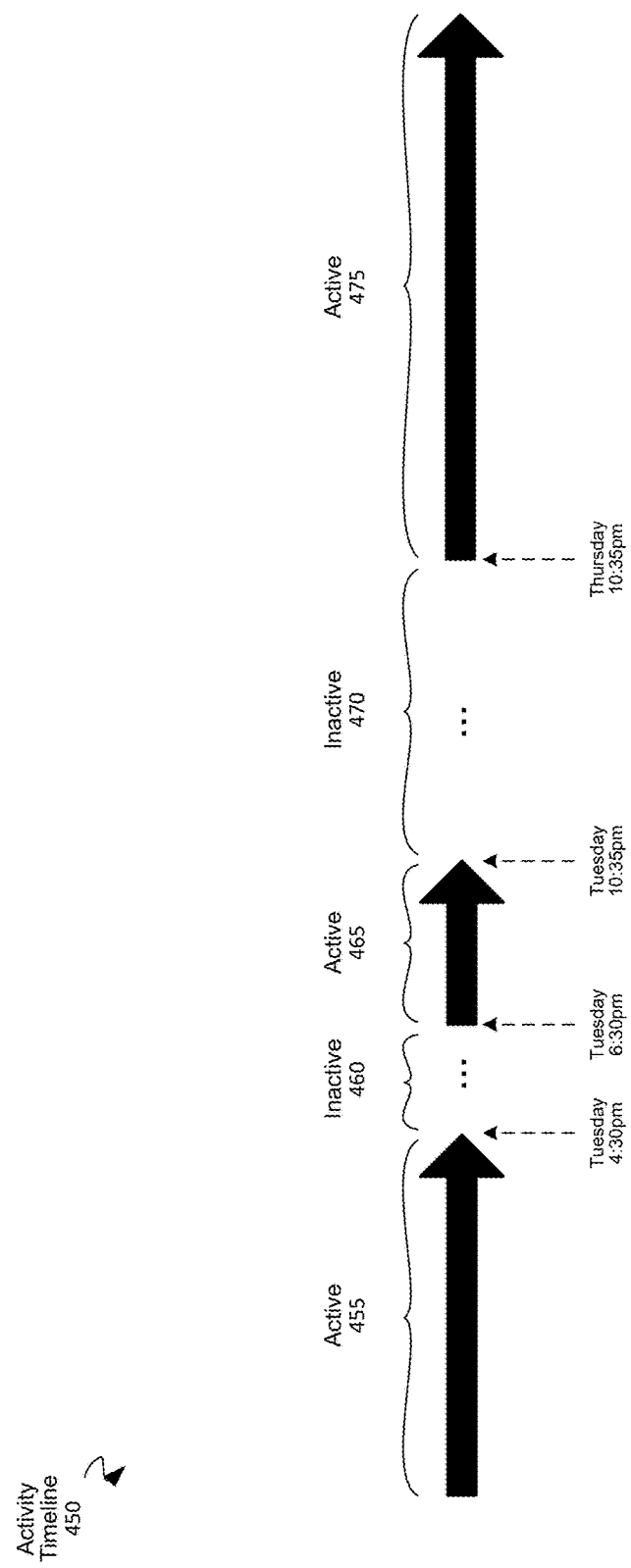
FIG. 4B shows a user account activity timeline in accordance with one or more embodiments of the invention.

FIG. 4B shows a user account activity timeline (450) in accordance with one or more embodiments of the invention. During a period that a user account was inactive (460 or 470) (for example, the user account was not accessed for at least a predefined time period, e.g., 2 hours or 2 days), a set of unviewed messages in the user account's message stream accumulate (e.g., in the message repository (140)). When the user account is eventually active (455 or 465) again (e.g., accessed), recent messages in the message timeline of the user account may be presented, as well as older messages that may have been stored on a client device (e.g., the client device (105). For example, the older messages may have been previously received from the messaging platform (100) during a previous active period, and cached on the client device (105). As a result, when the user account is once again active after a period of inactivity, these cached older messages may be accessed and displayed by the client device (105) without requiring to receive them from the messaging platform (100) once again.

However, a gap between the recent and older messages in the presented message timeline that corresponds to the accumulated set of unviewed messages may exist. For example, it may be inefficient to dynamically request and receive the accumulated set of unviewed messages because the user may not be interested in some or all of the unviewed messages. Referring to FIG. 4B, for example, a user account has a period of activity (455) up until Tuesday at 4:30 pm, at which point a period of inactivity (460) began. The user account has a period of activity (455) again starting Tuesday at 6:30 pm. During the active period (455 and 465) ending Tuesday at 4:30 pm and starting at 6:30 pm, the user account viewed messages in their message timeline. However, during the inactive period (460), between 4:30 pm and 6:30 pm, the user account missed messages in the message timeline, therefore, unviewed messages accumulated.

In one or more embodiments, a user interface element may be presented that when selected, causes the client device (105) to request the accumulated set of unviewed messages from the messaging platform (100) (e.g., specifically from the message repository (140)). For example, the user interface element may be positioned between the recent and older messages. The messaging platform (100) can send some or all of the accumulated unviewed messages to the client device (105). Regardless, the amount of accumulated unviewed messages sent may be very large, such that a user is overwhelmed with information.

FIG. 4A shows an example user interface (401) in accordance with one or more embodiments of the invention. As shown in FIG. 4A, the user interface (401) is operable to display highly ranked unviewed messages (417-420 and 423-426) corresponding to more than one period of inactivity (460 and 470) alongside other messages (415, 416, 421, 422, 427, and 428) corresponding to periods of activity (455, 465, and 475) in a context user's message stream. For example, the periods of activity (455, 465, and 475) and inactivity (460 and 470) in FIG. 4A may correspond to the periods of activity (455, 465, and 475) and inactivity (460 and 470) in FIG. 4B, respectively. Accordingly, instead of providing the entire set of unviewed messages corresponding to an inactive period, the messaging platform (100) (e.g., specifically the selection module (122)) can send only the top or highly ranked unviewed messages. The user interface generation module (270) can then present only those top or highly ranked unviewed messages (e.g., positioned in the displayed message stream in areas corresponding to periods of inactivity, respectively).

The groups of unviewed messages (417-420 and 423-426) and other messages (415, 416, 421, 422, 427, and 428) may be operable to scroll vertically altogether. However, the unviewed messages (417-420 and 423-426) may be operable to be scrolled horizontally such that one or more unviewed messages (417-420 and 423-426) corresponding to a period of inactivity (460 and 470) may be viewed. For example, the unviewed messages (417-420 and 423-426) may scroll horizontally through unviewed messages in a horizontal sliding and/or in a carousel scrolling fashion. It should be appreciated that various combinations of scrolling directions are possible. For example, both the groups of unviewed messages (417-420 and 423-426) and other messages (415, 416, 421, 422, 427, and 428) may be operable to scroll horizontally altogether while the unviewed messages (417-420 and 423-426) are also operable to scroll horizontally in place, both the groups of unviewed messages (417-420 and 423-426) and other messages (415, 416, 421, 422, 427, and 428) may be operable to scroll vertically altogether while the unviewed messages (417-420 and 423-426) are also operable to scroll vertically in place, and so on.

In one or more embodiments, the selection engine (122) can determine which periods of inactivity in a context user's activity timeline are suitable for receiving a set of highly ranked unviewed messages corresponding to that period of inactivity. For example, the determination can be based on one or more criteria (e.g., a minimum length of time of inactivity, a minimum amount of unviewed messages, various characteristics of messages in the message stream during the period of inactivity, and/or any other criteria relevant to periods of inactivity). For example, a user account may have to be inactive for more than 1 hour before the selection engine (122) designates the period as suitable for receiving a set of highly ranked unviewed messages. In another example, even though the user account remains inactive for a short period of time, during that period of time the amount of unviewed messages in the user account's message stream exceeds a predefined threshold, so the selection engine (122) designates the period as suitable. In another example, even though the user account remains inactive for a short period of time, during that period of time an amount of highly ranked unviewed messages in the user account's message stream exceeds a predefined threshold, so the selection engine (122) designates the period as suitable.

In one or more embodiments, the selection engine (122) can provide highly ranked unviewed messages specific to a subset of the context user's message stream or specific to a subset of global messages of the messaging platform (100). For example, the selection engine (122) can provide highly ranked unviewed messages specific to only one user account of the messaging platform (100). In one example, the context account may request highly ranked unviewed messages broadcasted by only one user account (e.g., a user travels to a friend's profile page on the messaging platform and requests to see highly ranked messages authored by the friend). In another example, the selection engine (122) can provide highly ranked unviewed messages specific to only certain topic categories of the messaging platform (100) (e.g., a user requests to see highly ranked messages related to sports, news, weather, etc.). Accordingly, the user interface generation module (270) can then present the highly ranked unviewed messages in area other than a context account's message stream (e.g., on a user account profile page, in a topic category section, and so on).

Figure 5:
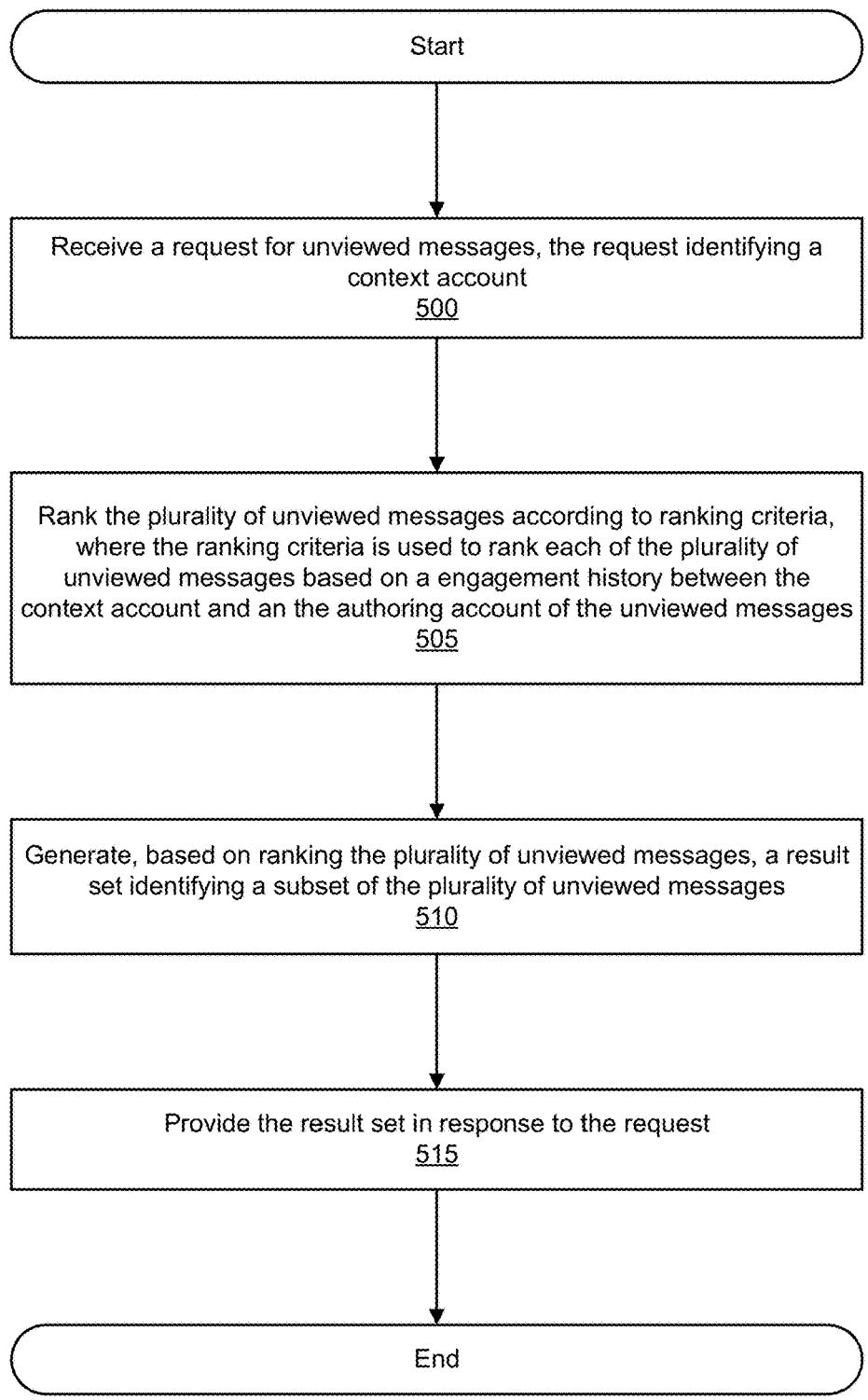
FIGS. 5 and 6 show flowcharts in accordance with one or more embodiments of the invention.

FIG. 5 shows a flowchart of an exemplary process of selecting a message. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 5 should not be construed as limiting the scope of the invention. Rather, it will be apparent to persons skilled in the relevant art(s) from the teachings provided herein that other functional flows are within the scope and spirit of the present invention. The flowchart may be described with continued reference to exemplary embodiments described above, though the method is not limited to those embodiments.

In Step 500, a request for unviewed messages, the request identifying a context account, is received. For example, a user sends the request using a client user interface. The request is received by the messaging platform. The request identifies the origin of the request by identifying the context account of the user.

In Step 505, the set of unviewed messages is ranked according to ranking criteria, where the ranking criteria is used to rank each of the set of unviewed messages based on an engagement history between the context account and an the authoring account of the unviewed messages. In one or more embodiments, the engagement history is accessed to obtain message metadata. The message metadata may be used to calculate a ranking score for each unviewed message according to the ranking criteria. When an unviewed message is ranked above a certain threshold, the unviewed message may be added to a subset.

In Step 510, a result set identifying a subset of the plurality of unviewed messages is generated based on ranking the plurality of unviewed messages. Generating the result set may be performed, for example, using the selection repository to temporarily store subsets of unviewed messages corresponding to the context account of a user. The subset of unviewed messages can be arranged according to the ranking score for each unviewed message. Other generating methods may be used without departing from the scope of the invention. All, none, or only a portion of FIG. 5 may be performed to generate the subset without departing from the scope of the invention. In Step 515, the result set is provided in response to the request. In one or more embodiments, the result set is displayed on a user interface to the user. The type of user interface may include the user interface as described in FIG. 4.

Figure 6:
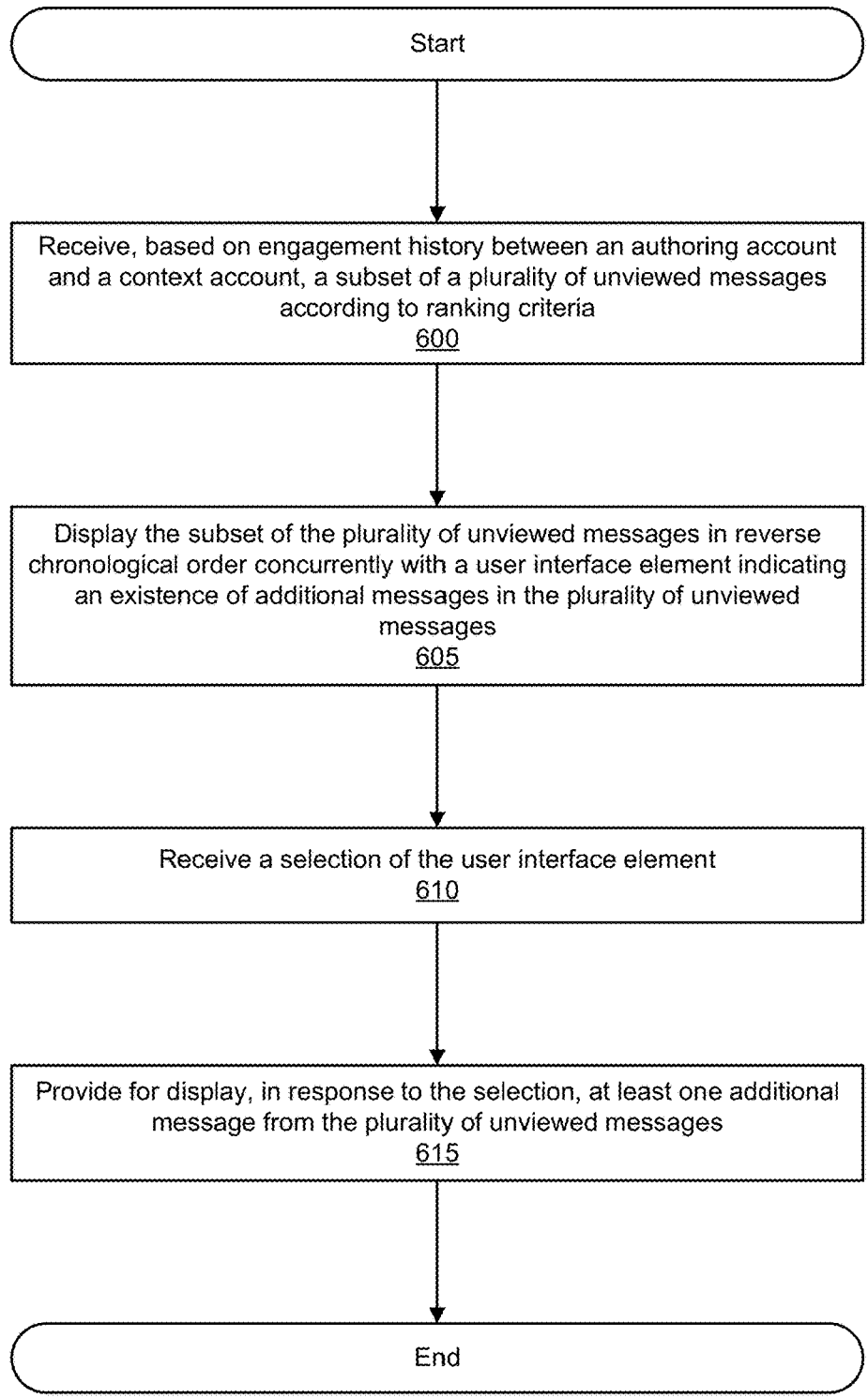

FIG. 6 shows a flowchart of an exemplary process of displaying a set of unviewed messages. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 6 should not be construed as limiting the scope of the invention. Rather, it will be apparent to persons skilled in the relevant art(s) from the teachings provided herein that other functional flows are within the scope and spirit of the present invention. The flowchart may be described with continued reference to exemplary embodiments described above, though the method is not limited to those embodiments.

In Step 600, a subset of a plurality of unviewed messages is received according to ranking criteria based on engagement history between an authoring account and a context account. Specifically, the user generation module may receive identifiers of and/or metadata related to the unviewed messages from the selection engine. Subsequently, the user interface generation module can generate user interface elements corresponding to the unviewed messages.

In Step 605, the subset of the plurality of unviewed messages is displayed in reverse chronological order concurrently with a user interface element indicating an existence of additional messages in the plurality of unviewed messages. The user interface generation module can sort the unviewed messages in any order represented by user interface elements. In addition, the user interface generation module can use a user interface element to represent an existence of additional messages, for example, during gaps of account inactivity.

In Step 610, a selection of the user interface element is received. For example, a selection of the user interface element can be received in response to an interaction by a user with a user interface element (e.g., by interaction with a touchscreen of a mobile device).

In Step 615, at least one additional message from the plurality of unviewed messages is provided for display in response to the selection. Specifically, additional messages can be selected by the selection engine according to the selection by the user. In response to the selection, the selection engine can select additional messages based on similar content (e.g., multimedia types, duplicate messages, etc.) with the selected message. For example, a user may select a user interface element of a user interface that represents a subset of a set of unviewed messages. In response, the user interface generation module generates additional user interface elements to represent each unviewed message of the subset of the set of unviewed messaged for display.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Embodiments of the invention may be implemented on virtually any type of computing system regardless of the platform being used. Examples of such a computing system can include one or more mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments of the invention.

Figure 7:
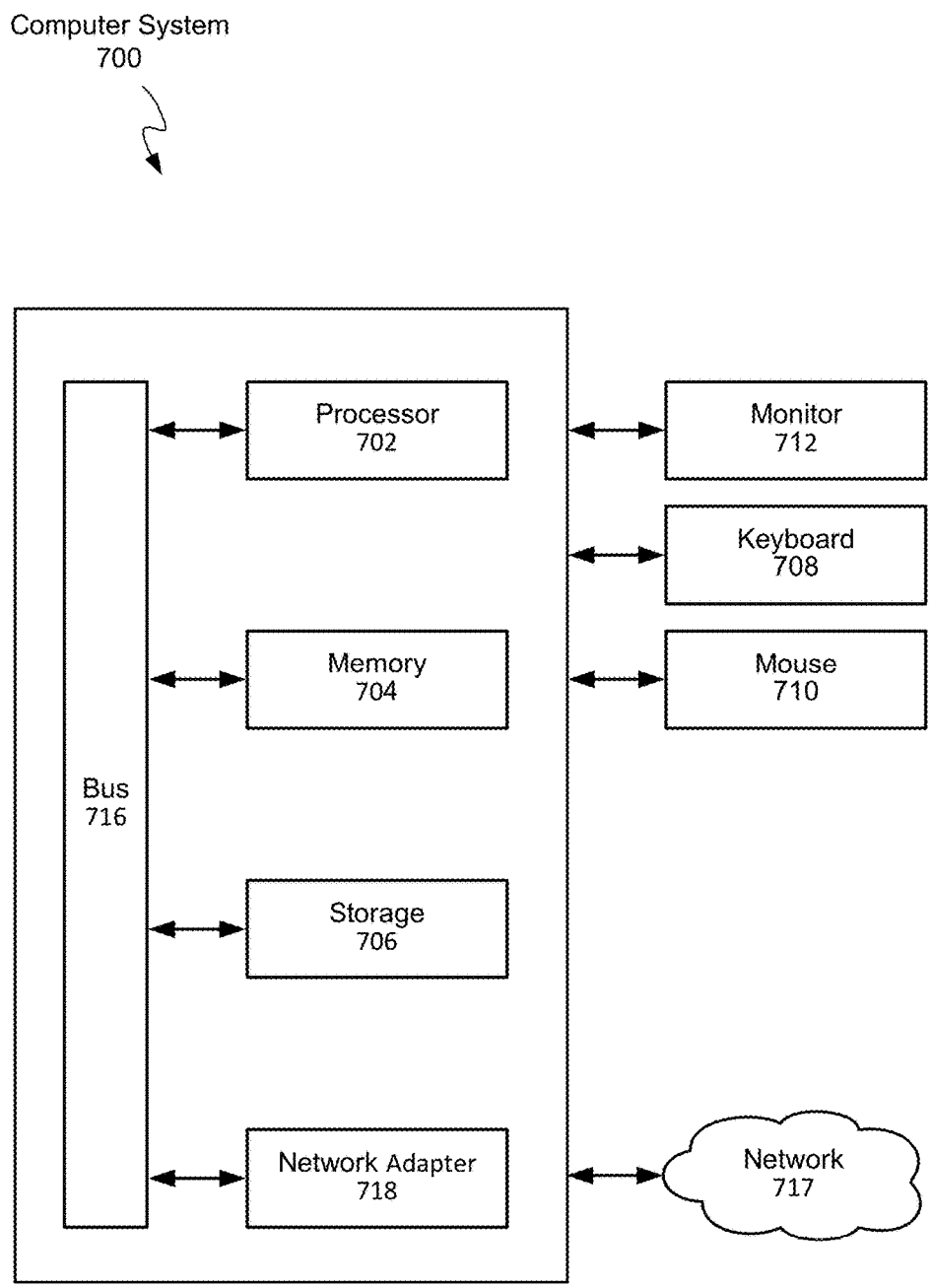
FIG. 7 shows a computing system in accordance with one or more embodiments of the invention.

For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. The computing system (700) may be connected to a network (714) (e.g., a local area network (LAN), a wide area network (WAN) such as the Internet, mobile network, or any other type of network) via a network interface connection (718). The input and output device(s) may be locally or remotely connected (e.g., via the network (712)) to the computer processor(s) (702), memory (704), and storage device(s) (706).

One or more elements of the aforementioned computing system (700) may be located at a remote location and connected to the other elements over a network (714). Further, embodiments of the invention may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems (e.g., FIGS. 1A and 2) may also be implemented using software modules that perform certain tasks. These software modules may include script, batch, or other executable files that may be stored on a computer-readable storage medium or in a computing system. These software modules may configure a computing system to perform one or more of the example embodiments disclosed herein. The computer readable program code can be stored, temporarily or permanently, on one or more non-transitory computer readable storage media. The non-transitory computer readable storage media are executable by one or more computer processors to perform the functionality of one or more components of the above-described systems (e.g., FIGS. 1A and 2) and/or flowcharts (e.g., FIGS. 5 and 6). Examples of non-transitory computer-readable media can include, but are not limited to, compact discs (CDs), flash memory, solid state drives, random access memory (RAM), read only memory (ROM), electrically erasable programmable ROM (EE-PROM), digital versatile disks (DVDs) or other optical storage, and any other computer-readable media excluding transitory, propagating signals.

While the invention has been described with respect to a limited number of embodiments, those skilled in the art, having benefit of this disclosure, will appreciate that other embodiments may be devised which do not depart from the scope of the invention as disclosed herein.

What is claimed is:

1. A method for message selection, comprising:
   receiving a request for unviewed messages associated with a social networking message stream for a context account of a social messaging platform;
   in response to the request, determining a plurality of unviewed messages, wherein each unviewed message is received in the social networking message stream during one or more periods of inactivity by the context account;
   ranking the plurality of unviewed messages according to ranking criteria, wherein the ranking includes computing a score for each unviewed message based on a plurality of measures of engagement between the context account and respective authoring accounts of the unviewed messages, wherein the plurality of measures of engagement include a number of messages authored by each respective authoring account within a specified time period and a number of connections of the respective authoring accounts to other accounts of the social messaging platform;
   generating, based on ranking the plurality of unviewed messages, a result set identifying a subset of the plurality of unviewed messages; and
   providing the result set in response to the request to a client device associated with the context account for presentation of one or more unviewed messages of the results set.

2. The method of claim 1, wherein ranking the plurality of unviewed messages according to ranking criteria further comprises:
   identifying an amount of related messages of the plurality of unviewed messages from a first account associated with the context account; and
   ranking, based on the amount of related messages, the related messages from the plurality of unviewed messages.

3. The method of claim 2, wherein ranking the plurality of unviewed messages according to ranking criteria further comprises:
   identifying an amount of the related messages between the first account and a second account; and
   ranking the related messages, based on the amount of the related messages between the first account and the second account.

4. The method of claim 1, wherein ranking the plurality of unviewed messages according to ranking criteria further comprises:
   identifying a second subset of the plurality of unviewed messages authored by a preferred account associated with the context account; and
   ranking the plurality of unviewed messages, wherein the second subset of the plurality of unviewed messages is favorably weighted according to the ranking criteria based on being authored by the preferred account.

5. The method of claim 1, wherein ranking the plurality of unviewed messages according to ranking criteria further comprises:
   identifying a plurality of affiliated accounts;
   identifying, among the plurality of unviewed messages, a set of affiliated messages authored by the plurality of affiliated accounts; and
   ranking the set of affiliated messages based on a level of affiliation.

6. The method of claim 1, wherein ranking the plurality of unviewed messages according to ranking criteria, further comprises:
   identifying, for each of the plurality of unviewed messages, an engagement frequency between the authoring account of the unviewed messages and the context account; and
   ranking the unviewed messages according to the engagement frequency.

7. The method of claim 1, wherein the plurality of measures of engagement with a particular authoring account includes at least one or more of a number of rebroadcasts of social networking messages of the authoring account, a number of favorites of the social networking messages of the authoring account, or a number of references to social networking messages of the authoring account by the context account.

8. The method of claim 1, wherein ranking the plurality of unviewed messages comprises determining a recency of engagement between the context account and broadcast social networking messages authored by the respective authoring accounts of the unviewed messages.

9. The method of claim 1, wherein ranking the plurality of unviewed messages includes calculating a multimedia score for each unviewed message based on whether the message content includes a particular media type.

10. The method of claim 1, wherein a score for each of the one or more ranking criteria are individually weighted and then combined to determine the score for each unviewed message.

11. A system for message selection, comprising:
    a computer processor;
    a selection repository comprising a plurality of unviewed messages associated with a message stream of a context account of a social messaging platform;
    a selection engine executing on the computer processor and configured to:
    receive a request for unviewed messages associated with a social networking message stream for a context account;
    in response to the request, determine a plurality of unviewed messages, wherein each unviewed message is received in the social networking message stream during one or more periods of inactivity by the context account;
    rank the plurality of unviewed messages according to ranking criteria, wherein the ranking includes computing a score for each unviewed message based on a plurality of measures of engagement between the context account and an authoring accounts of the unviewed messages, wherein the plurality of measures of engagement include a number of messages authored by each respective authoring account within a specified time period and a number of connections of the respective authoring accounts to other accounts of the social messaging platform;

generate, based on ranking the plurality of unviewed messages, a result set identifying a subset of the plurality of unviewed messages; and provide the result set in response to the request to a client device associated with the context account for presentation of one or more unviewed messages of the results set.

12. The system of claim 11, wherein ranking the plurality of unviewed messages according to ranking criteria further comprises:

identifying an amount of related messages of the plurality of unviewed messages from a first account associated with the context account; and ranking, based on the amount of related messages, the related messages from the plurality of unviewed messages.

13. The system of claim 12, wherein ranking the plurality of unviewed messages according to ranking criteria further comprises:

identifying an amount of the related messages between the first account and a second account; and ranking the related messages, based on the amount of the related messages between the first account and the second account.

14. The system of claim 11, wherein ranking the plurality of unviewed messages according to ranking criteria further comprises:

identifying a second subset of the plurality of unviewed messages authored by a preferred account associated with the context account; and ranking the plurality of unviewed messages, wherein the second subset of the plurality of unviewed messages is favorably weighted according to the ranking criteria based on being authored by the preferred account.

15. The system of claim 11, wherein ranking the plurality of unviewed messages according to ranking criteria further comprises:

identifying a plurality of affiliated accounts;

identifying, among the plurality of unviewed messages, a set of affiliated messages authored by the plurality of affiliated accounts; and ranking the set of affiliated messages based on a level of affiliation.

16. The system of claim 11, wherein ranking the plurality of unviewed messages according to ranking criteria, further comprises:

identifying, for each of the plurality of unviewed messages, an engagement frequency between the authoring account of the unviewed messages and the context account; and ranking the unviewed messages according to the engagement frequency.

17. The system of claim 11, wherein the plurality of measures of engagement with a particular authoring account includes at least one or more of a number of rebroadcasts of social networking messages of the authoring account, a number of favorites of the social networking messages of the authoring account, or a number of references to social networking messages of the authoring account by the context account.

18. The system of claim 11, wherein ranking the plurality of unviewed messages comprises determining a recency of engagement between the context account and broadcast social networking messages authored by the respective authoring accounts of the unviewed messages.

19. The system of claim 11, wherein ranking the plurality of unviewed messages includes calculating a multimedia score for each unviewed message based on whether the message content includes a particular media type.

20. The system of claim 11, wherein a score for each of the one or more ranking criteria are individually weighted and then combined to determine the score for each unviewed message.

21. A non-transitory computer readable medium comprising a plurality of instructions for message selection in a messaging platform, the plurality of instructions configured to execute on at least one computer processor to enable the computer processor to:

receive a request for unviewed messages associated with a social networking message stream for a context account of a social messaging platform;

in response to the request, determine a plurality of unviewed messages, wherein each unviewed message is received in the social networking message stream during one or more periods of inactivity by the context account;

rank the plurality of unviewed messages according to a set of ranking criteria, wherein the ranking includes computing a score for each unviewed message based on a plurality of measures of engagement between the context account and an authoring accounts of the unviewed messages, wherein the plurality of measures of engagement include a number of messages authored by each respective authoring account within a specified time period and a number of connections of the respective authoring accounts to other accounts of the social messaging platform;

generate, based on ranking the plurality of unviewed messages, a result set identifying a subset of the plurality of unviewed messages; and provide the result set to in response to the request to a client device associated with the context account for presentation of one or more unviewed messages of the results set.

22. The non-transitory computer readable medium of claim 21, wherein ranking the plurality of unviewed messages according to ranking criteria further comprises:

identifying an amount of related messages of the plurality of unviewed messages from a first account associated with the context account; and ranking, based on the amount of related messages, the related messages from the plurality of unviewed messages.

23. The non-transitory computer readable medium of claim 22, wherein ranking the plurality of unviewed messages according to ranking criteria further comprises:

identifying an amount of the related messages between the first account and a second account; and ranking the related messages, based on the amount of the related messages between the first account and the second account.

24. The non-transitory computer readable medium of claim 21, wherein ranking the plurality of unviewed messages according to ranking criteria further comprises:

identifying a second subset of the plurality of unviewed messages authored by a preferred account associated with the context account; and ranking the plurality of unviewed messages, wherein the second subset of the plurality of unviewed messages is favorably weighted according to the ranking criteria based on being authored by the preferred account.

25. The non-transitory computer readable medium of claim 21, wherein ranking the plurality of unviewed messages according to ranking criteria further comprises:

identifying a plurality of affiliated accounts;

identifying, among the plurality of unviewed messages, a set of affiliated messages authored by the plurality of affiliated accounts; and ranking the set of affiliated messages based on a level of affiliation.

26. The non-transitory computer readable medium of claim 21, wherein ranking the plurality of unviewed messages according to ranking criteria, further comprises:

identifying, for each of the plurality of unviewed messages, an engagement frequency between the authoring account of the unviewed messages and the context account; and ranking the unviewed messages according to the engagement frequency.

27. The non-transitory computer readable medium of claim 21, wherein the plurality of measures of engagement with a particular authoring account includes at least one or more of a number of rebroadcasts of social networking messages of the authoring account, a number of favorites of the social networking messages of the authoring account, or a number of references to social networking messages of the authoring account by the context account.

28. The non-transitory computer readable medium of claim 21, wherein ranking the plurality of unviewed messages comprises determining a recency of engagement between the context account and broadcast social networking messages authored by the respective authoring accounts of the unviewed messages.

29. The non-transitory computer readable medium of claim 21, wherein ranking the plurality of unviewed messages includes calculating a multimedia score for each unviewed message based on whether the message content includes a particular media type.

30. The non-transitory computer readable medium of claim 21, wherein a score for each of the one or more ranking criteria are individually weighted and then combined to determine the score for each unviewed message.

* * * * *